United States Patent [19]
Andrews

[11] Patent Number: 5,649,308
[45] Date of Patent: Jul. 15, 1997

[54] MULTIFORMAT AUTO-HANDOFF COMMUNICATIONS HANDSET

[75] Inventor: Scott Andrews, Long Beach, Calif.

[73] Assignee: TRW Inc., Redondo Beach, Calif.

[21] Appl. No.: 556,863

[22] Filed: Nov. 2, 1995

Related U.S. Application Data

[63] Continuation of Ser. No. 48,045, Apr. 12, 1993, abandoned.

[51] Int. Cl.⁶ .................................................. H04B 1/38
[52] U.S. Cl. ............................................ 370/334; 455/84
[58] Field of Search ........................... 455/33.2, 33.3, 455/33.4, 34.1, 34.2, 54.1, 56.1, 89, 84; 379/60

[56] References Cited

U.S. PATENT DOCUMENTS

| | | | |
|---|---|---|---|
| 4,901,307 | 2/1990 | Gilhousen et al. | 370/18 |
| 4,972,455 | 11/1990 | Phillips et al. | 455/76 |
| 5,020,092 | 5/1991 | Phillips et al. | 455/77 |
| 5,020,093 | 5/1991 | Pireh | 455/77 |
| 5,101,501 | 3/1992 | Gilhousen et al. | 455/33.2 |
| 5,127,042 | 6/1992 | Gillig et al. | 379/59 |
| 5,252,979 | 10/1993 | Nysen | 455/73 |
| 5,295,152 | 3/1994 | Gudmundson et al. | 375/205 |
| 5,323,446 | 6/1994 | Kojima et al. | 455/33.2 |
| 5,329,635 | 7/1994 | Wadin et al. | 455/33.2 |
| 5,392,462 | 2/1995 | Komaki | 455/89 |
| 5,428,664 | 6/1995 | Kobayashi | 455/89 |
| 5,438,683 | 8/1995 | Durcer et al. | 455/74 |
| 5,509,035 | 4/1996 | Teidemann, Jr. et al. | 455/33.2 |

*Primary Examiner*—Edward F. Urban
*Attorney, Agent, or Firm*—Michael S. Yatsko

[57] ABSTRACT

Disclosed is an apparatus and method for supporting communications and handoffs between multiple signal formats at multiple carrier frequencies. Antenna circuitry which includes a linearly polarized antenna and a circularly polarized antenna is utilized to receive and transmit the multiple signal formats at the multiple carrier frequencies simultaneously. A pair of RF signal paths each including RF transmit circuitry, RF receive circuitry and RF processing capabilities are utilized to support simultaneous communications between two signal formats. A multisystem controller in communications with each RF signal path initiates and completes handoffs between the multiple signal formats utilizing both RF signal paths to achieve uninterrupted communications across a large service coverage area.

39 Claims, 4 Drawing Sheets

MULTIFORMAT AUTO-HANDOFF COMMUNICATIONS HANDSET

This application is a continuation of U.S. patent application Ser. No. 08/048,045, filed Apr 12, 1993, now abandoned.

BACKGROUND OF THE INVENTION

1. Field of the Invention

This invention relates generally to a communications handset and, more particularly, to a multiformat auto-handoff communications handset to support communications and handoffs between multiple signal formats at multiple carrier frequencies.

2. Discussion of the Related Art

Mobile and cellular communication systems currently utilize several types of signal formats and carrier frequencies. For example, some of the various cellular standards used today include AMPS (Analog Modulation Phone Service), IS-54 (North American Digital Cellular), PCN (Personal Communications Network), DECT (European Digital Cordless Telephone Standard) and GSM (Groupe Speciale Mobile). These signal formats typically operate around 800 MHz to 900 MHz or around 1.70 GHz to 1.90 GHz and utilize a network of terrestrial base stations.

In addition, with the immense growth in the mobile and cellular communications industry, many new and planned signal formats and carrier frequencies will be utilized to increase the number of possible users and the service coverage areas. These new and planned signal formats include FDM (Frequency Division Multiplex), TDMA (Time Division Multiple Access), CDMA (Code Division Multiple Access) and many others. The new and planned signal formats will operate between 800 MHz to about 2.40 GHz and utilize both terrestrial base stations and satellite base stations.

Today, the currently utilized communications handsets (telephone) are each specifically designed to support a particular signal format and a particular carrier frequency. Therefore, each communications handset is quite limited in its capabilities to support multiple signal formats at multiple carrier frequencies. The current approaches to making the communications handsets more compatible with various signal formats and also various carrier frequencies is essentially to build multiple RF (radio frequency) hardware strings, such that each RF hardware string is capable of supporting a particular signal format at a particular carrier frequency. Another approach is to use add-on circuitry to convert the communications handset from one signal format to another or from one carrier frequency to another. Yet another extreme approach is to maintain multiple communications handsets so that when the user exits one service coverage area, the user would utilize another communications handset to initiate a new call in the particular service coverage area.

However, these current approaches are very poor and not cost effective since they easily double the RF hardware required and waste precious RF output power generated by the communications handset. This directly impacts on the size and the weight of the communications handset as well as the battery operating time. In addition, the multiple circuits and the add-on circuitry adds a significant additional cost to the communications handset.

What is needed then is a multiformat auto-handoff communications handset which is capable of: supporting multiple signal formats at multiple carrier frequencies; eliminating multiple RF hardware strings; operating over a broadband and extending the service coverage area by communicating over both terrestrial and satellite base stations. It is therefore an object of the present invention to provide such a device.

SUMMARY OF THE INVENTION

In accordance with the present invention, a multiformat auto-handoff communications handset is utilized to support communications and handoffs between multiple signal formats at multiple carrier frequencies. This is basically achieved by utilizing a first and a second RF signal path each capable of supporting the multiple signal formats at the multiple carrier frequencies and a multisystem controller. This essentially allows the first RF signal path to be utilized during normal communications until the user begins to exit the service coverage area of that signal format. Once this is detected by the multisystem controller, the multisystem controller will initiate a handoff utilizing the second RF signal path to establish communications with another signal format in another service coverage area. After the connection is established on the second RF signal path, the communications occurring in the first RF signal path is terminated. This allows the user of the communications handset to maintain an uninterrupted call beyond the service coverage area of one signal format.

In one preferred embodiment, antenna circuitry receives and transmits the multiple signal formats at the multiple carrier frequencies. The antenna circuitry is capable of simultaneously receiving a first RF receive signal and a second RF receive signal as well as being capable of simultaneously transmitting a first RF transmit signal and a second RF transmit signal. The first RF receive signal received by the antenna circuitry is down converted into a first IF (intermediate frequency) receive signal by a first broadband RF receive system and the second RF receive signal is down converted into a second IF receive signal by a second broadband RF receive system. The first IF receive signal is then demodulated in a first digital/IF baseband processor controller while the second IF receive signal is demodulated in a second digital/IF baseband processor controller.

The first IF/baseband processor controller modulates a first IF transmit signal and the second digital/IF baseband processor controller modulates a second IF transmit signal. The first IF transmit signal is up converted into the first RF transmit signal by a first broadband RF transmit system and the second IF transmit signal is up converted into the second RF transmit signal by a second broadband RF transmit system. The first RF transmit signal and the second RF transmit signal are then transmitted by the antenna circuitry. In addition, the multisystem controller is utilized for initiating and completing handoffs between the multiple signal formats at the multiple carrier frequencies.

Use of the present invention results in supporting multiple signal formats at multiple carrier frequencies by employing a multiformat auto-handoff communications handset. As a result, the aforementioned problems associated with the current approaches have been substantially eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT

The following description of a multiformat auto-handoff communications handset to support communications and handoffs between multiple signal formats at multiple carrier frequencies is merely exemplary in nature and is in no way intended to limit the invention or its application or uses.

Figure 1:
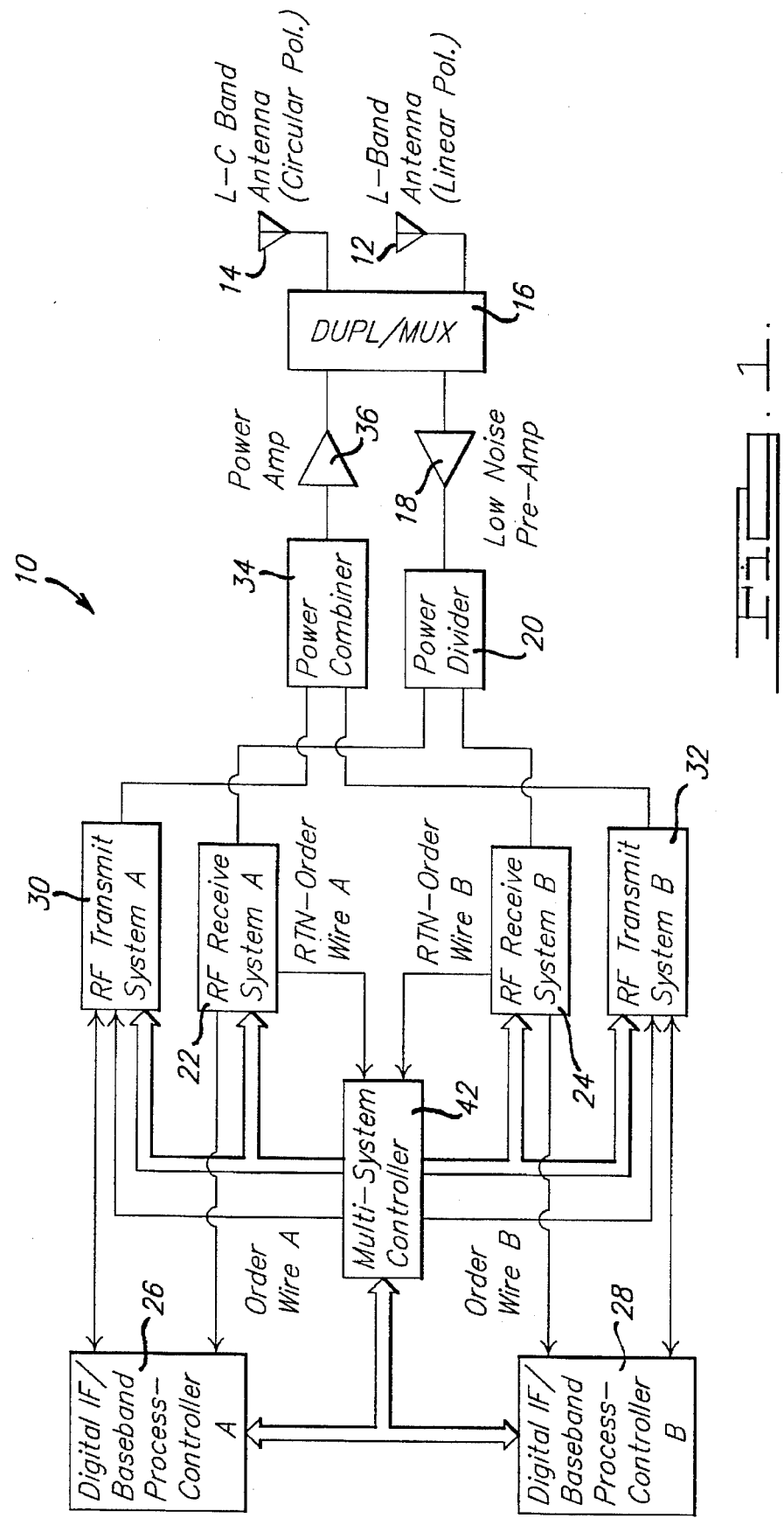
FIG. 1 is a schematic/block diagram of one preferred embodiment of the present invention.

Referring to FIG. 1, a schematic/block diagram of one preferred embodiment of a multiformat auto-handoff communications handset 10 to support communications and handoffs between multiple signal formats at multiple carrier frequencies, is shown. The multiformat auto-handoff communications handset 10 preferably includes a linearly polarized L-band antenna 12 and a circularly polarized LC-band antenna 14. The linearly polarized L-band antenna 12 preferably operates in the range of 800 MHz to 950 MHz and is typically utilized for transmitting and receiving RF signals from terrestrial base stations (not shown). The circularly polarized LC-band antenna 14 preferably operates in the range of 1.5 GHz to 2.4 GHz and is typically utilized for transmitting and receiving RF signals from satellite mounted transponders (not shown). A first RF receive signal and a second RF receive signal received from the linearly polarized L-band antenna 12 and the circularly polarized LC-band antenna 14 are applied to a bi-directional broadband duplexor/multiplexor 16. The bidirectional broadband duplexor/multiplexor 16 combines the first RF receive signal and the second RF receive signal and applies the combined RF receive signal to a broadband low noise pre-amp 18. The broadband low noise pre-amp 18 operates over a one and a half octave bandwidth (800 MHz to 2.4 GHz) and amplifies the combined RF receive signal from the bidirectional broadband duplexor/multiplexor 16 while adding only a minimal amount of noise. The broadband low noise pre-amp 18 applies the combined amplified RF receive signal to a power divider 20 which splits the power of the combined amplified RF receive signal to apply substantially identical images of the first RF receive signal and the second RF receive signal to a RF receive system 22 and a RF receive system 24.

Assuming the RF receive system 22 is operating at the first RF receive signal format and frequency, the RF receive system 22 will accept the first RF receive signal and down convert it into a first IF receive signal which is applied to a digital IF/baseband processor controller 26. Making the same assumption for the RF receive system 24, the RF receive system 24 will down convert the second RF receive signal into a second IF receive signal which is applied to a digital IF/baseband processor controller 28. The IF receive signals have a bandwidth of a few hundred KHz and vary depending on the particular signal format used. The digital IF/baseband processor controllers 26 and 28 are preferably silicon monolithic integrated circuits which are capable of demodulating the IF receive signals to extract voice and/or operating data which is provided either to the user of the multiformat auto-handoff communications handset 10 or utilized internally. These digital IF/baseband processor controllers 26 and 28 are preferably constructed from a chip set consisting of a Motorola DSP 56000, two 64K PROMs, two 8K RAMs, and a CODEC chip to do baseband voice coding. However, one skilled in the art will readily recognize that Application Specific Integrated Circuits (ASICs) can also be utilized that incorporate the functions of the above-mentioned chip set.

Voice data from the user and/or operating data is modulated in the digital IF/baseband processor controllers 26 and 28 to create a first IF transmit signal and a second IF transmit signal. The first IF transmit signal is applied to a RF transmit system 30 and the second IF transmit signal is applied to a RF transmit system 32. The RF transmit system 30 up converts the first IF transmit signal into a first RF transmit signal at the appropriate carrier frequency and the RF transmit system 32 up converts the second IF transmit signal into a second RF transmit signal at the appropriate carrier frequency.

The first RF transmit signal and the second RF transmit signal are applied to a power combiner 34 which combines the first RF transmit signal and the second RF transmit signal and applies the combined RF transmit signal to a broadband power amp 36. The broadband power amp 36 is preferably a broadband linear power amplifier which amplifies the combined RF transmit signal and applies the combined amplified RF transmit signal to the bidirectional broadband duplexor/multiplexor 16. The bidirectional broadband duplexor/multiplexor 16 splits the combined RF transmit signal and applies the first RF transmit signal and the second RF transmit signal to either the linearly polarized L-band antenna 12 or the circularly polarized LC-band antenna 14, depending on the signal format and frequency.

Figure 2:
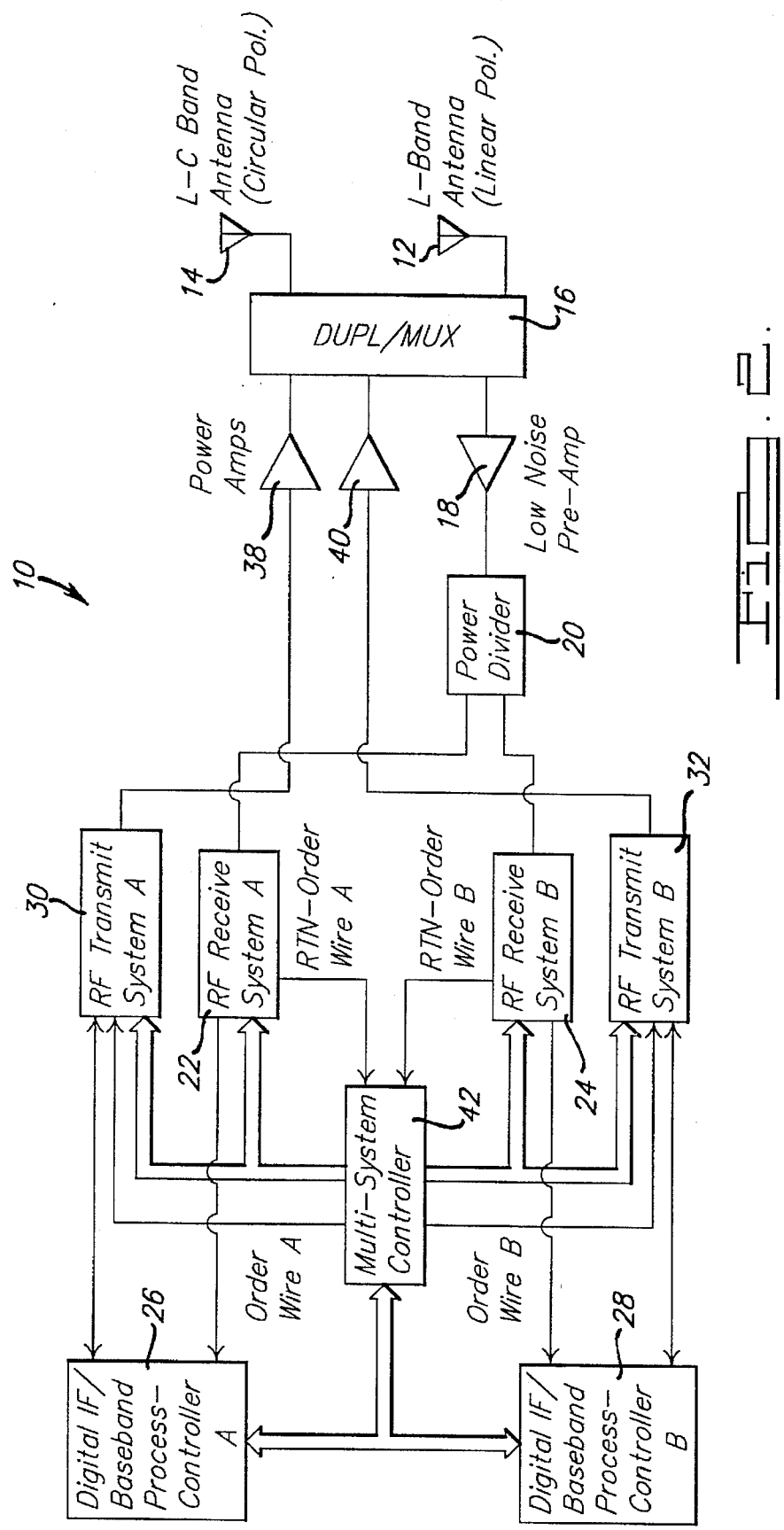
FIG. 2 is a schematic/block diagram of another preferred embodiment of the present invention.

In another preferred embodiment, shown clearly in FIG. 2, the first RF transmit signal is applied to a broadband power amp 38 and the second RF transmit signal is applied to a broadband power amp 40. The broadband power amp 38 amplifies the first RF transmit signal and applies it to the bidirectional broadband duplexor/multiplexor 16 and the broadband power amp 40 amplifies the second RF transmit signal and also applies it to the bidirectional broadband duplexor/multiplexor 16. The bidirectional broadband duplexor/multiplexor 16 applies the first RF transmit signal and the second RF transmit signal to either the linearly polarized L-band antenna 12 or the circularly polarized LC-band antenna 14 depending on the signal format and frequency. This embodiment essentially eliminates the power combiner 34 and utilizes the pair of broadband power amps 38 and 40 to amplify the separate RF transmit signals.

Returning to FIG. 1, in operation, the multiformat auto-handoff communications handset 10 typically utilizes only a single RF signal path consisting of either the RF receive system 22, the digital IF/baseband processor controller 26 and the RF transmit system 30 or the RF receive system 24, the digital IF/baseband processor controller 28 and the RF transmit system 32. However, when a handoff is required between different signal formats, the multiformat auto-handoff communications handset 10 utilizes both RF signal paths. For example, if the user is first communicating with another user through a terrestrial base station (not shown), a first RF receive signal will be received by the linearly polarized L-band antenna 12, routed through the bidirectional broadband duplexor/multiplexor 16 and applied to the broadband low noise pre-amp 18. The broadband low noise pre-amp 18 will amplify the first RF receive signal and apply it to the power divider 20. The power divider 20 will split the power of the first RF receive signal and apply it to the RF receive system 22 and the RF receive system 24. Assuming the RF receive system 22 is the RF signal path currently being utilized, the RF receive system 22 will down convert the first RF receive signal into an appropriate first IF receive signal and apply it to the digital IF/baseband processor controller 26. The digital IF/baseband processor controller 26 will demodulate the first IF receive signal to extract the voice and/or operating data to pass it to the user and/or use it internally.

The digital IF/baseband processor controller 26 will also modulate voice and/or operating data into a first IF transmit signal which is applied to the RF transmit system 30. The RF transmit system 30 will up convert the first IF transmit signal into a first RF transmit signal and apply it through the power combiner 34 to the broadband power amp 36. The broadband power amp 36 will amplify the first RF transmit signal and apply it to the bidirectional broadband duplexor/multiplexor 16. The bidirectional broadband duplexor/multiplexor 16 will apply the amplified first RF transmit signal to the linearly polarized L-band antenna 12.

As the communications are occurring between the users, a multisystem controller 42 monitors the power level and the operating data of the first RF receive signal applied to the RF receive system 22. The multisystem controller 42 is preferably a 16 bit microprocessor programmed to perform the various control functions. Moreover, one skilled in the art would recognize that the multisystem controller 42 can consist of an 8 bit microprocessor or be incorporated into the digital IF/baseband processor controllers 26 and 28. If the multisystem controller 42 detects that the signal level received from the terrestrial base station is too low, or that the terrestrial base station cannot handoff within the service coverage area of the signal format being used, the multisystem controller 42 will initiate its handoff sequence to connect the user to another signal format in order to insure an uninterrupted call. This condition typically occurs when the user enters into an outer fringe area of that particular service coverage area of that signal format. The multisystem controller 42 internally contains a hierarchy of signal formats programmed into it such that the multisystem controller 42 will attempt to connect the user to various signal formats until a successful connection is reached.

When the multisystem controller 42 initiates its handoff sequence, the multisystem controller 42 will issue an order wire (similar to what occurs when a user picks up a phone) through the currently idle RF transmit system 32. The multisystem controller 42 will transmit operating data such as the user ID number and the type of signal format to be used to the digital IF/baseband processor controller 28. The digital IF/baseband processor controller 28 modulates this operating data into an appropriate second IF transmit signal which is applied to the RF transmit system 32. The RF transmit system 32 will up convert the second IF transmit signal into a second RF transmit signal (order wire) at the appropriate carrier frequency and apply it to the power combiner 34. The power combiner 34 combines the second RF transmit signal with the first RF transmit signal and applies the combined RF transmit signal to the broadband power amp 36. The broadband power amp 36 amplifies the combined RF transmit signal and applies it to the bidirectional broadband duplexor/multiplexor 16. The bidirectional broadband duplexor/multiplexor 16 will separate the combined RF transmit signal and apply the first RF transmit signal to the linearly polarized L-band antenna 12, while also applying the second RF transmit signal (order wire) to the circularly polarized LC-band antenna 14, assuming the multisystem controller 42 is attempting a link with a satellite system (not shown).

If the user is in the operating area of the satellite system, the satellite system will issue a return order wire (similar to receiving a dial tone on a phone). This return order wire will be received by the circularly polarized LC-band antenna 14, routed through the bidirectional broadband duplexor/multiplexor 16, amplified in the broadband low noise pre-amp 18, divided through the power divider 20 and applied to the RF receive system 24 to complete the connection. Once this connection is made, the multisystem controller 42 will direct the IF/baseband processor controller 26 to cease communicating with the terrestrial base station and direct the digital IF/baseband processor controller 28 to take over the call through the satellite system.

Figure 3:
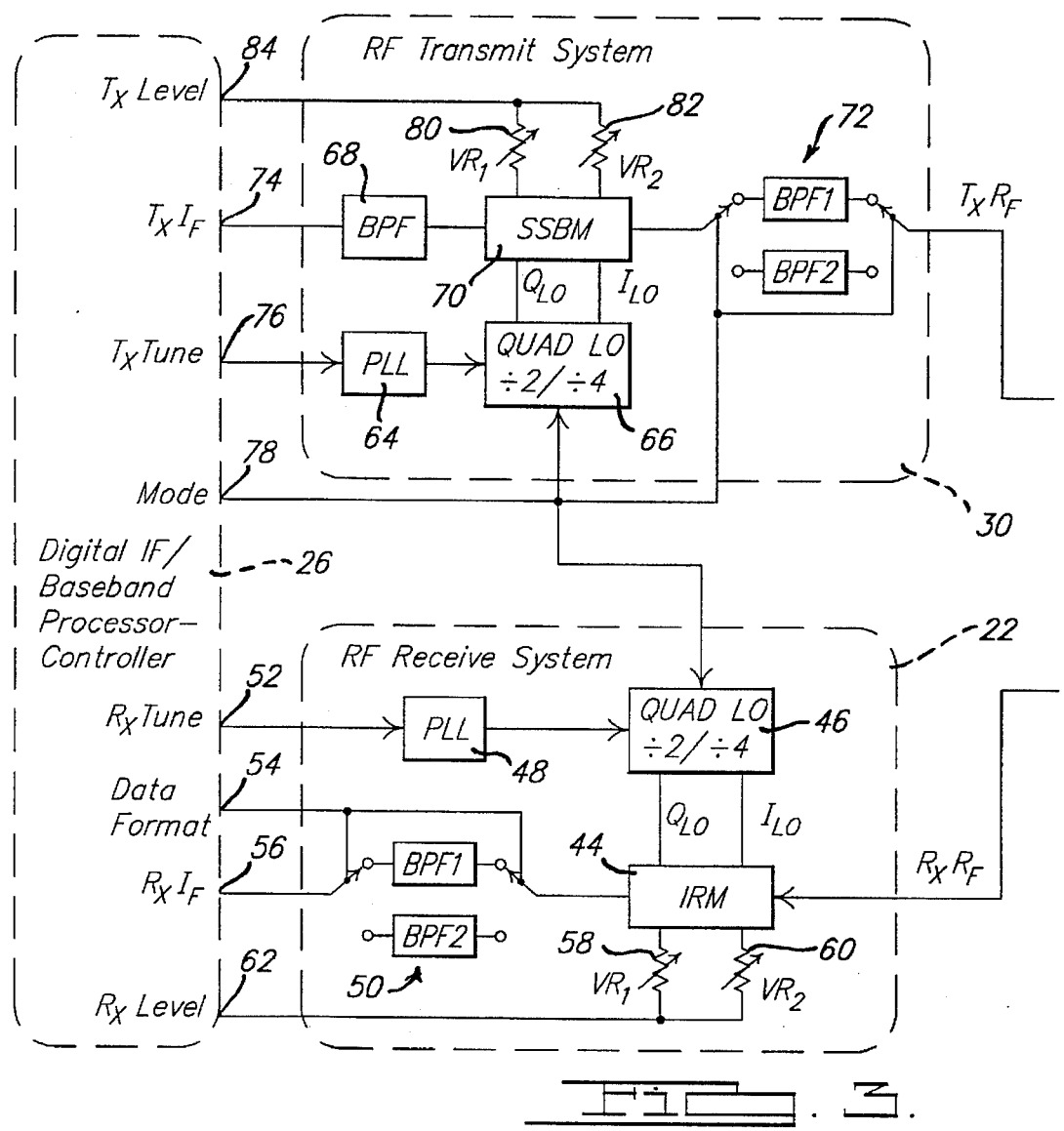
FIG. 3 is a detailed schematic/block diagram of an RF receive system, an RF transmit system and a digital IF/baseband processor controller of the present invention.

Turning to FIG. 3, the RF signal path consisting of the RF receive system 22, the digital IF/baseband processor controller 26 and the RF transmit system 30, is shown in more detail. It should be noted that this RF signal path is substantially identical to the RF signal path consisting of the RF receive system 24, the digital IF/baseband processor controller 28 and the RF transmit system 32. The RF receive system 22 includes a dual ortho broadband image reject mixer 44, a quadrature LO generator 46, a phase lock loop 48, and a set of switchable bandpass filters 50. The phase lock loop 48 is adjusted by the digital IF/baseband processor controller 26 through a RX Tune port 52 which essentially adjusts the frequency of the quadrature LO generator 46. The quadrature LO generator 46 produces a pair of quadrature signals which are substantially 90° out of phase of each other over a broad frequency range. The pair of quadrature signals consist of an in phase signal ($I_{Lo}$) and a quadrature signal ($Q_{Lo}$) which are mixed with the RF receive signal in the dual ortho broadband image reject mixer 44. The dual ortho broadband image reject mixer 44, which will be discussed in more detail shortly, essentially down converts the RF receive signal into an appropriate IF receive signal while also rejecting an image signal. The IF receive signal is applied to the set of switchable bandpass filters 50, which is set to a particular bandpass filter from a Data Format port 54 in the digital IF/baseband processor controller 26 based on the type of signal format being utilized. Thus, the set of switchable bandpass filters 50 essentially band limits the IF receive signal applied to a $RX_{IF}$ port 56 in the digital IF/baseband processor controller 26. In order to optimize the amplitude rejection of the image reject mixer 44, a pair of variable resistors 58 and 60 are utilized. The variable resistors 58 and 60 are adjusted during the manufacturing of the multiformat auto-handoff communications handset 10 to insure proper amplitude matching. In addition, in order to maintain a constant IF receive signal level into the digital IF/baseband processor controller 26, a RX Level port 62 in the digital IF/baseband processor controller 26 is used to adjust the signal strength of the IF receive signal through the dual ortho broadband image reject mixer 44.

The RF transmit system 30 includes a phase lock loop 64, a quadrature LO generator 66, a bandpass filter 68, a broadband single sideband modulator 70 and a set of switchable bandpass filters 72. To transmit an RF transmit signal, the digital IF/baseband processor controller 26 modulates voice and/or operating data into an IF transmit signal which is applied from a $TX_{IF}$ port 74 to the bandpass filter 68. The bandpass filter 68 band limits the IF transmit signal applied to the broadband single sideband modulator 70. The broadband single sideband modulator 70, which will also be discussed in more detail shortly, mixes the IF transmit signal with a pair of quadrature signals ($I_{Lo}$ and $Q_{Lo}$) from the quadrature LO generator 66. The pair of quadrature signals ($I_{Lo}$ and $Q_{Lo}$) are tuned by the phase lock loop 64 which is adjusted by a TX Tune port 76 in the digital IF/baseband processor controller 26. This causes the broadband single sideband modulator 70 to up convert the IF transmit signal into an appropriate RF transmit signal while also rejecting an image signal. The RF transmit signal is then applied to the set of switchable bandpass filters 72. The switchable bandpass filters 72 are switched by a Mode port 78 to band limit the RF transmit signal in order to eliminate transmitting harmonics (noise) of the RF transmit signal. In order to optimize the amplitude rejection of the broadband single sideband modulator 70, a pair of variable resistors 80 and 82 are adjusted during manufacturing to insure proper amplitude matching. In addition, a TX Level port 84 in the digital IF/baseband processor controller 26 is utilized to adjust the output power level of the RF transmit signal. This is done in order to increase the power of the RF transmit signal when the user is distant from the base station and to lower the power when the user is nearer the base station.

Figure 4:
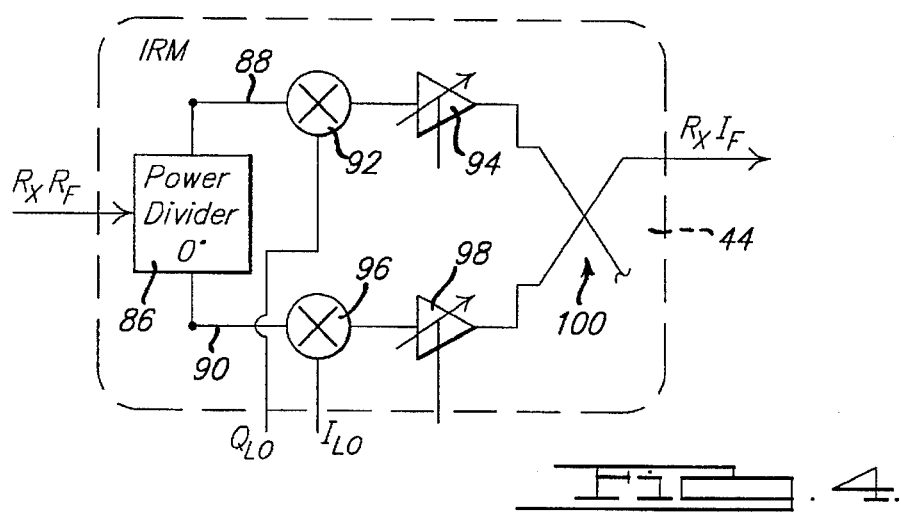
FIG. 4 is a detailed schematic/block diagram of a dual ortho broadband image reject mixer of the present invention.

When the RF receive signal is applied to the dual ortho broadband image reject mixer 44, shown clearly in FIG. 4, a 0° power divider 86 splits the power of the RF receive signal and applies substantially identical images of the RF receive signal to a lower image branch 88 and an upper image branch 90. The RF receive signal applied to the lower image branch 88 is mixed in a mixer 92 with the quadrature signal ($Q_{Lo}$) from the quadrature LO generator 46. The mixer 92 essentially multiplies the RF receive signal with the quadrature signal ($Q_{Lo}$) and applies the resultant signal to a variable quadrature amp 94. The RF receive signal applied to the upper image branch 90 is mixed in a mixer 96 with the in phase signal ($I_{Lo}$) from the quadrature LO generator 46. The resultant signal is applied to a variable in phase amp 98. The variable quadrature amp 94 is adjusted by variable resistor 58 while the variable in phase amp 98 is adjusted by variable resistor 60 in order to achieve optimal amplitude matching between the lower image branch 88 and the upper image branch 90. In addition, the variable quadrature amp 94 and the variable in phase amp 98 are also adjusted through the RX Level port 62 in the digital IF/baseband processor controller 26. The resultant signals on the lower image branch 88 and the upper image branch 90 are applied to a 90° coupler 100 which adds 90° to the signal in the upper image branch 90 and sums this with the signal in the lower image branch 88. This results in suppressing a lower image signal while retaining an upper image signal as the IF receive signal.

Figure 5:
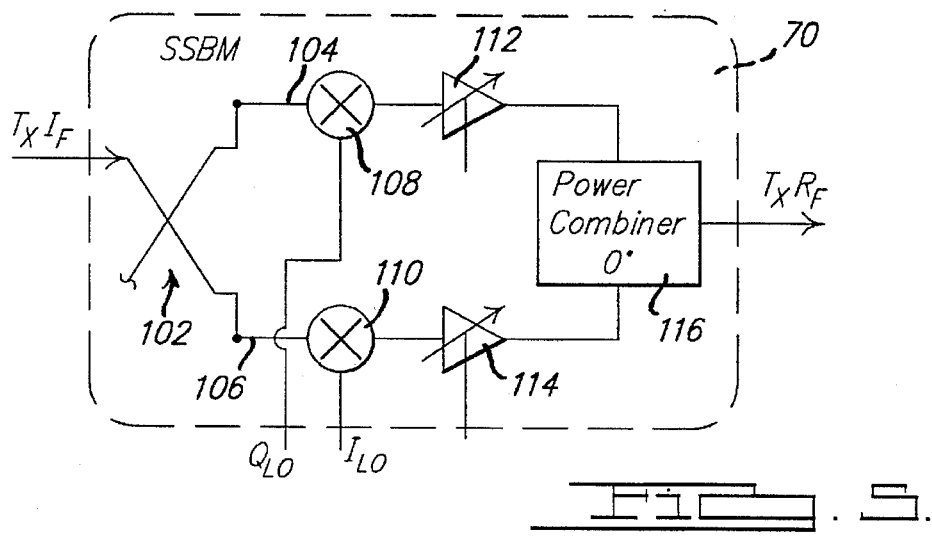
FIG. 5 is a detailed schematic/block diagram of a broadband single sideband modulator of the present invention.

When the IF transmit signal is applied to the broadband single sideband modulator 70, shown clearly in FIG. 5, it is applied through a 90° coupler 102. The 90° coupler 102 produces a pair of quadrature IF transmit signals which are applied to a lower image branch 104 and an upper image branch 106. The IF transmit signal in the lower image branch 104 is mixed in a mixer 108 with the quadrature signal ($Q_{Lo}$) from the quadrature LO generator 66 while the IF transmit signal in the upper image branch 106 is mixed in a mixer 110 with the in phase signal ($I_{Lo}$) also from the quadrature LO generator 66. The resultant signal in the lower image branch 104 is amplified by a variable quadrature amp 112 and the resultant signal in the upper image branch 106 is amplified by a variable in phase amp 114. The variable quadrature amp 112 is adjusted by the variable resistor 80 and the variable in phase amp 114 is adjusted by the variable resistor 82 to ensure optimal amplitude matching. In addition, the variable quadrature amp 112 and the variable in phase amp 114 are also adjusted by the TX Level port 84 in the digital IF/baseband processor controller 26. The resultant signals in the lower image branch 104 and the upper image branch 106 are both applied to a 0° power combiner 116 which essentially sums the resultant signals from the lower image branch 104 and the upper image branch 106. This results in suppressing a lower image signal thereby leaving an upper image signal as the RF transmit signal.

Figure 6:
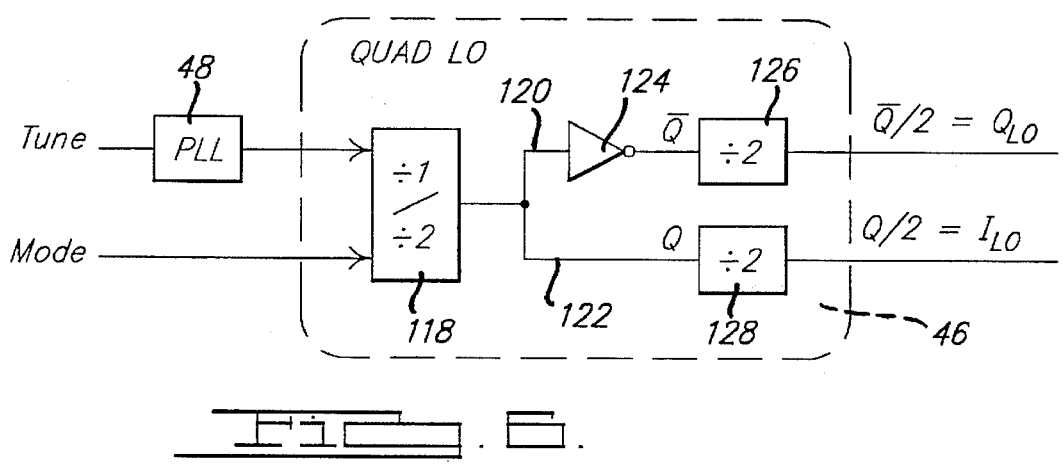
FIG. 6 is a detailed schematic/block diagram of a quadrature LO (local oscillator) generator of the present invention.

Turning to FIG. 6, the quadrature LO generator 46, which is substantially identical to the quadrature LO generator 66, includes a divide by one/divide by two circuit 118 which is connected to a quadrature branch 120 and an in phase branch 122. The quadrature branch 120 includes an inverter 124 and a divide by two circuit 126 and the in phase branch 122 includes a divide by two circuit 128. A tuning signal from the phase lock loop 48 which is used to adjust the frequency of the quadrature pair signals ($Q_{Lo}$ and $I_{Lo}$) is applied to the divide by one/divide by two circuit 118. A mode signal from the Mode port 78 in the digital IF/baseband process controller 26 is also applied to the divide by one/divide by two circuit 118 which causes the divide by one/divide by two circuit 118 to either divide the tuning signal by one or by two. The resultant tuning signal is then applied to the quadrature branch 120 and the in phase branch 122. The signal in the quadrature branch 120 is inverted in the inverter 124 and divided by two in the divide by two circuit 126 to produce the quadrature signal ($Q_{Lo}$). The signal applied to the in phase branch 122 is divided by two in the divide by two circuit 128 to produce the in phase signal ($I_{Lo}$). Because of this configuration, the phase lock loop 48 can be used to tune the pair of quadrature signals ($Q_{Lo}$ and $I_{Lo}$) over a very broad frequency range while only being adjusted over a very small fraction of the total bandwidth. For example, if the phase lock loop 48 is operating at about 3.60 GHz, it can be divided by two in the divide by one/divide by two circuit 118 and also divided by two in the divide by two circuit 126 and the divide by two circuit 128 to produce a pair of quadrature signals at 900 MHz. This ultimately allows the quadrature LO generator 46 to produce highly accurate quadrature signal pairs over a bandwidth preferably from $_{800}$ MHz to 2.40 GHz.

Figure 7:
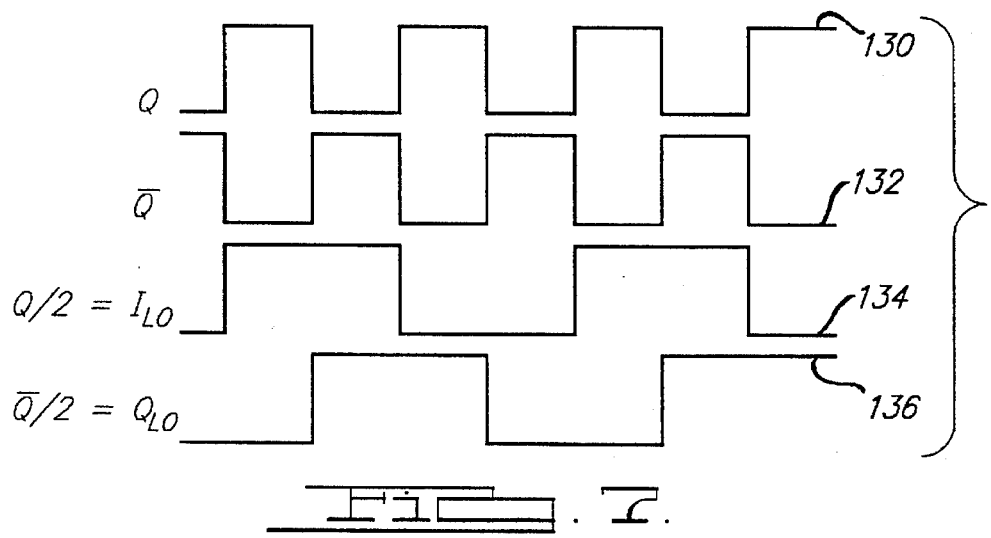
FIG. 7 is a waveform diagram of the output of the quadrature LO generator of FIG. 6.

A waveform diagram in FIG. 7 illustrates how the quadrature LO generator produces the pair of quadrature signals ($Q_{Lo}$ and $I_{Lo}$). The waveform 130 represents the tuning signal from the phase lock loop 48 which is divided by one in the divide by one/divide by two circuit 118. The waveform 132 shows the waveform 130 inverted as it passes through the inverter 124 before it is applied to the divide by two circuit 126. The waveform 134 shows the output signal ($I_{Lo}$) from the in phase branch 122 while the waveform 136 shows the output signal ($Q_{Lo}$) from the quadrature branch 120. One can clearly see from FIG. 7 that the quadrature LO generator 46 can produce a pair of quadrature signals ($Q_{Lo}$ and $I_{Lo}$) over a very broad frequency range while only slightly adjusting the tuning signal from the phase lock loop 48.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined by the following claims.

What is claimed is:

1. A multiformat auto-handoff communications handset to support communications and handoffs between multiple signal formats at multiple carrier frequencies, said multiformat auto-handoff communications handset comprising:

antenna means for receiving and transmitting the multiple signal formats at the multiple carrier frequencies, said antenna means for simultaneously receiving a first RF receive signal and a second RF receive signal and for simultaneously transmitting a first RF transmit signal and a second RF transmit signal;

first broadband RF receive means for down converting the first RF receive signal into a first IF receive signal, said first broadband RF receive means including a first quadrature LO generator operable to produce a first pair of quadrature signals substantially 90° out of phase of each other over a frequency range of between about 800 MHz to 2.4 GHz, first broadband RF transmit means for up converting a first IF transmit signal into the first RF transmit signal, and first IF processor means for demodulating multiple signal formats of the first IF receive signal and for modulating multiple signal formats of the first IF transmit signal;

second broadband RF receive means for down converting the second RF receive signal into a second IF receive signal, said second broadband RF receive means including a second quadrature LO generator operable to produce a second pair of quadrature signals substantially 90° out of phase of each other over a frequency range of between about 800 MHz to 2.4 GHz, second broadband RF transmit means for up converting a second IF transmit signal into the second RF transmit signal, and second IF processor means for demodulating multiple signal formats of the second IF receive signal and for modulating multiple signal formats of the second IF transmit signal; and multisystem controller means for initiating and completing handoffs between the multiple signal formats at the multiple carrier frequencies.

2. The multiformat auto-handoff communications handset as defined in claim 1 wherein the antenna means includes a linearly polarized antenna and a circularly polarized antenna, said linearly polarized antenna and said circularly polarized antenna each operable to receive one of either the first RF receive signal or the second RF receive signal and each operable to transmit one of either the first RF transmit signal or the second RF transmit signal.

3. The multiformat auto-handoff communications handset as defined in claim 2 further comprising a bidirectional broadband duplexor/multiplexor, a broadband low noise pre-amp, a power divider, a power combiner and a broadband power amp, said bidirectional broadband duplexor/multiplexor operable to combine the first RF receive signal and the second RF receive signal into a combined RF receive signal, said broadband low noise pre-amp operable to amplify the combined RF receive signal, said power divider operable to split the combined RF receive signal, said power combiner operable to combine the first RF transmit signal from the first RF transmit means and the second RF transmit signal from the second RF transmit means into a combined RF transmit signal, said broadband power amp operable to amplify the combined RF transmit signal and said bidirectional broadband duplexor/multiplexor further operable to split the combined RF transmit signal and apply the first RF transmit signal and the second RF transmit signal to one of either the linearly polarized antenna or the circularly polarized antenna.

4. The multiformat auto-handoff communications handset as defined in claim 2 further comprising a bidirectional broadband duplexor/multiplexor, a broadband low noise pre-amp, a power divider, a first power amp, and a second power amp, said bidirectional broadband duplexor/multiplexor operable to combine the first RF receive signal and the second RF receive signal into a combined RF receive signal, said broadband low noise pre-amp operable to amplify the combined RF receive signal, said power divider operable to split the combined RF receive signal, said first power amp operable to amplify the first RF transmit signal from the first RF transmit means, said second power amp operable to amplify the second RF transmit signal from the second RF transmit means and said bidirectional broadband duplexor/multiplexor further operable to apply the first RF transmit signal and the second RF transmit signal to one of either the linearly polarized antenna or the circularly polarized antenna.

5. The multiformat auto-handoff communications handset as defined in claim 1 wherein the first RF receive means includes a first dual ortho broadband image reject mixer and the second RF receive means includes a second dual ortho broadband image reject mixer, said first dual ortho broadband image reject mixer operable to convert the first RF receive signal into the first IF receive signal, said second dual ortho broadband image reject mixer operable to convert the second RF receive signal into the second IF receive signal.

6. The multiformat auto-handoff communications handset as defined in claim 5 wherein the first RF receive means further includes a first phase lock loop and the second RF receive means further includes a second phase lock loop, said first phase lock loop operable to produce a first tuning signal to adjust the tuning of the first quadrature LO generator, said second phase lock loop operable to produce a second tuning signal to adjust the tuning of the second quadrature LO generator.

7. The multiformat auto-handoff communications handset as defined in claim 6 wherein the first RF receive means further includes a plurality of first switchable bandpass filters and the second RF receive means further includes a plurality of second switchable bandpass filters, said first plurality of switchable bandpass filter operable to band limit the first IF receive signal from the first dual ortho broadband image reject mixer, said second plurality of switchable bandpass filters operable to band limit the second IF receive signal from the second dual ortho broadband image reject mixer.

8. The multiformat auto-handoff communications handset as defined in claim 6 wherein the first quadrature LO generator includes a first divide by one/divide by two circuit and the second quadrature LO generator includes a second divide by one/divide by two circuit, said first divide by one/divide by two circuit operable to divide the first tuning signal by one of either one or two, said second divide by one/divide by two circuit operable to divide the second tuning signal by one of either one or two.

9. The multiformat auto-handoff communications handset as defined in claim 5 wherein the first dual ortho broadband image reject mixer includes a first 0° power divider, a first in phase mixer, a first quadrature mixer, a first adjustable in phase amp and a first adjustable quadrature amp and the second dual ortho broadband image reject mixer includes a second 0° power divider, a second in phase mixer, a second quadrature mixer, a second adjustable in phase amp and a second adjustable quadrature amp, said first 0° power divider operable to split the first RF receive signal into a first upper RF receive signal and a first lower RF receive signal, said first in phase mixer operable to mix the first upper RF receive signal with the first in phase signal, said first quadrature mixer operable to mix the first lower RF receive signal with the first quadrature signal, said first adjustable in phase amp operable to amplify the product of the first upper RF receive signal and the first in phase signal and said first adjustable quadrature amp operable to amplify the product of the first lower RF receive signal and the first quadrature signal, said second 0° power divider operable to split the power of the second RF receive signal into a second upper RF receive signal and a second lower RF receive signal, said second in phase mixer operable to mix the second upper RF receive signal with the second in phase signal, said second quadrature mixer operable to mix the second lower RF receive signal with the second quadrature signal, said second adjustable in phase amp operable to amplify the product of the second upper RF receive signal and the second in phase signal and said second adjustable quadrature amp operable to amplify the product of the second lower RF receive signal and the second quadrature signal.

10. The multiformat auto-handoff communications handset as defined in claim 9 wherein the first dual ortho broadband image reject mixer further includes a first 90° coupler and the second dual ortho broadband image reject mixer further includes a second 90° coupler, said first 90° coupler operable to add 90° to the product of the first upper RF receive signal and the first in phase signal and operable to sum it with the product of the first lower RF receive signal and the first quadrature signal, said second 90° coupler operable to add 90° to the product of the second upper RF receive signal and the second in phase signal and operable to sum it with the product of the second lower RF receive signal and the second quadrature signal.

11. The multiformat auto-handoff communications handset as defined in claim 8 wherein the first divide by one/divide by two circuit is in electrical connection with a first quadrature branch having a first inverter and a first divide by two circuit and a first in phase branch having a second divide by two circuit and the second divide by one/divide by two circuit is in electrical connection with a second quadrature branch having a second inverter and a third divide by two circuit and a second in phase branch having a fourth divide by two circuit, said first quadrature branch operable to invert the first tuning signal and divide the first tuning signal by two, said first in phase branch operable to divide the first tuning signal by two, said second quadrature branch operable to invert the second tuning signal and divide the second tuning signal by two, said second in phase branch operable to divide the second tuning signal by two.

12. The multiformat auto-handoff communications handset as defined in claim 1 wherein the first RF transmit means includes a first broadband single sideband modulator and the second RF transmit means includes a second broadband single sideband modulator, said first broadband single sideband modulator operable to convert the first IF transmit signal into the first RF transmit signal, said second broadband single sideband modulator operable to convert the second IF transmit signal into the second RF transmit signal.

13. The multiformat auto-handoff communications handset as defined in claim 12 wherein the first RF transmit means further includes a first quadrature LO generator and the second RF transmit means further includes a second quadrature LO generator, said first quadrature LO generator operable to produce a first pair of quadrature signals substantially 90° out of phase of each other over a frequency range of between about 800 MHz to 2.4 GHz, said first pair of quadrature signals including a first in phase signal and a first quadrature signal, said second quadrature LO generator operable to produce a second pair of quadrature signals substantially 90° out of phase of each other over a frequency range of between about 800 MHz to 2.4 GHz, said second pair of quadrature signals including a second in phase signal and a second quadrature signal.

14. The multiformat auto-handoff communications handset as defined in claim 13 wherein the first broadband single sideband modulator includes a first 90° coupler, a first in phase mixer, a first quadrature mixer, a first adjustable in phase amp, a first adjustable quadrature amp and a first 0° power combiner and the second single side band modulator includes a second 90° coupler, a second in phase mixer, a second quadrature mixer, a second adjustable in phase amp, a second adjustable quadrature amp and a second 0° power combiner, said first 90° coupler operable to produce a first pair of IF transmit quadrature signals substantially 90° out of phase of each other, said first pair of IF transmit quadrature signals including a first IF transmit in phase signal and a first IF transmit quadrature signal, said first in phase mixer operable to mix the first IF transmit quadrature signal with the first in phase signal, said first quadrature mixer operable to mix the first IF transmit in phase signal with the first quadrature signal, said first adjustable in phase amp operable to amplify the product of the first IF transmit quadrature signal and the first in phase signal, said first adjustable quadrature amp operable to amplify the product of the first IF transmit in phase signal and the first quadrature signal and said first 0° power combiner operable to combine the product of the first IF transmit quadrature signal and the first in phase signal with the product of the first IF transmit in phase signal and the first quadrature signal, said second 90° coupler operable to produce a second pair of IF transmit quadrature signals substantially 90° out of phase of each other, said second pair of IF transmit quadrature signals including a second IF transmit in phase signal and a second IF transmit quadrature signal, said second in phase mixer operable to mix the second IF transmit quadrature signal with the second in phase signal, said second quadrature mixer operable to mix the second IF transmit in phase signal with the second quadrature signal, said second adjustable in phase amp operable to amplify the product of the second IF transmit quadrature signal and the second in phase signal, said second adjustable quadrature amp operable to amplify the product of the second IF transmit in phase signal and the second quadrature signal and said second 0° power combiner operable to combine the product of the second IF transmit quadrature signal and the second in phase signal with the product of the second IF transmit in phase signal and the second quadrature signal.

15. The multiformat auto-handoff communications handset as defined in claim 13 wherein the first RF transmit means further includes a first phase lock loop and the second RF transmit means further includes a second phase lock loop, said first phase lock loop operable to produce a first tuning signal to adjust the tuning of the first quadrature LO generator, said second phase lock loop operable to produce a second tuning signal to adjust the tuning of the second quadrature LO generator.

16. The multiformat auto hand-off communications handset as defined in claim 15 wherein the first quadrature LO generator includes a first divide by one/divide by two circuit and the second quadrature LO generator includes a second divide by one/divide by two circuit, said first divide by one/divide by two circuit operable to divide the first tuning signal by one of either one or two, said second divide by one/divide by two circuit operable to divide the second tuning signal by one of either one or two.

17. The multiformat auto-handoff communications handset as defined in claim 15 wherein the first RF transmit means further includes a first bandpass filter and the second RF transmit means further includes a second bandpass filter, said first bandpass filter operable to band limit the first IF transmit signal from the first IF processor means, said second bandpass filter operable to band limit the second IF transmit signal from the second IF processor means.

18. The multiformat auto-handoff communications handset as defined in claim 17 wherein the first RF transmit means further includes a plurality of first switchable bandpass filters and the second RF transmit means further includes a plurality of second switchable bandpass filters, said plurality of first switchable bandpass filters operable to band limit the first RF transmit signal from the first broadband single sideband modulator, said plurality of second switchable bandpass filters operable to band limit the second RF transmit signal from the second broadband single sideband modulator.

19. The multiformat auto-handoff communications handset as defined in claim 16 wherein the first divide by one/divide by two circuit is in electrical connection with a first quadrature branch having a first inverter and a first divide by two circuit and a first in phase branch having a second divide by two circuit and the second divide by one/divide by two circuit is in electrical connection with a second quadrature branch having a second inverter and a third divide by two circuit and a second in phase branch having a fourth divide by two circuit, said first quadrature branch operable to invert the first tuning signal and divide the first tuning signal by two, said first in phase branch operable to divide the first tuning signal by two, said second quadrature branch operable to invert the second tuning signal and divide the second tuning signal by two, said second in phase branch operable to divide the second tuning signal by two.

20. The multiformat auto-handoff communications handset as defined in claim 1 wherein the first IF processor means includes a first digital IF/baseband processor controller and the second IF processor means includes a second digital IF/baseband processor controller, said first digital IF/baseband processor controller operable to demodulate multiple signal formats of the first IF receive signal to extract voice and operating data and operable to modulate voice and operating data into multiple signal formats of the first IF transmit signal, said second digital IF/baseband processor controller operable to demodulate multiple signal formats of the second IF receive signal to extract voice and operating data and operable to modulate voice and operating data into multiple signal formats of the second IF transmit signal.

21. The multiformat auto-handoff communications handset as defined in claim 20 wherein the first digital IF/baseband processor controller is operable to receive the first IF receive signal and transmit the first IF transmit signal at a multiple signal format selected from the group consisting of AMPS, IS-54, PCN, DECT, GSM, FDM, TDMA and CDMA and the second digital IF/baseband processor controller is operable to receive the second IF receive signal and transmit the second IF transmit signal at a multiple signal format selected from the group consisting of AMPS, IS-54, PCN, DECT, GSM, FDM, TDMA and CDMA.

22. The multiformat auto-handoff communications handset as defined in claim 1 wherein the multisystem controller means includes a multisystem controller, said multisystem controller in electrical communication with the first broadband RF receive means, the first broadband RF transmit means, the first IF processor means, the second broadband RF receive means, the second broadband RF transmit means and the second IF processor means.

23. The multiformat auto-handoff communications handset as defined in claim 22 wherein the multisystem controller contains a program hierarchy to enable the multisystem controller to select a signal format selected from the group consisting of AMPS, IS-54, PCN, DECT, GSM, FDM, TDMA and CDMA.

24. The multiformat auto-handoff communications handset as defined in claim 22 wherein the multisystem controller is further operable to monitor the power level of the first RF receive signal and direct the second RF transmit means to issue an order wire to initiate a handoff between a currently operating signal format and signal frequency to an available signal format and signal frequency.

25. The multiformat auto-handoff communications handset as defined in claim 22 wherein the multisystem controller is further operable to monitor the power level of the second RF receive signal and direct the first RF transmit means to issue an order wire to initiate a handoff between a currently operating signal format and signal frequency to an available signal format and signal frequency.

26. A multiformat auto-handoff communications handset to support communications and hand-offs between multiple signal formats at multiple carrier frequencies, said multiformat auto-handoff communications handset comprising:

antenna means for receiving and transmitting the multiple signal formats at the multiple carrier frequencies, said antenna means for simultaneously receiving a first RF receive signal and a second RF receive signal and for simultaneously transmitting a first RF transmit signal and a second RF transmit signal;

a first RF signal path, said first RF signal path including a first RF receive system for down converting the first RF receive signal into a first IF receive signal, a first RF transmit system for up converting a first IF transmit signal into the first RF transmit signal and a first digital IF/baseband processor controller for demodulating multiple signal formats of the first IF receive signal and for modulating multiple signal formats of the first IF transmit signal, said first RF transmit system including a first quadrature LO generator operable to produce a first pair of quadrature signals substantially 90° out of phase of each other over a frequency range of between about 800 MHz to 2.4 GHz;

a second RF signal path, said second RF signal path including a second RF receive system for down converting the second RF receive signal into a second IF receive signal, a second RF transmit system for up converting a second IF transmit signal into the second RF transmit signal and a second digital IF/baseband processor controller for demodulating multiple signal formats of the second IF receive signal and for modulating multiple signal formats of the second IF transmit signal, said second RF transmit system including a second quadrature LO generator operable to produce a second pair of quadrature signals substantially 90° out of phase of each other over a frequency range of between about 800 MHz to 2.4 GHz; and a multisystem controller for initiating and completing handoffs between the multiple signal formats at the multiple carrier frequencies by utilizing the first RF signal path and the second RF signal path.

27. The multiformat auto-handoff communications handset as defined in claim 26 wherein the first RF receive system includes a first dual ortho broadband image reject mixer to convert the first RF receive signal into the first IF receive signal.

28. The multiformat auto-handoff communications handset as defined in claim 27 wherein the first RF transmit system includes a first broadband single sideband modulator to convert the first IF transmit signal into the first RF transmit signal.

29. The multiformat auto-handoff communications handset as defined in claim 28 wherein the first RF receive system further includes a first quadrature LO generator to produce a first pair of quadrature signals substantially 90° out of phase of each other over a frequency range of between about 800 MHz to 2.4 GHz and the first RF transmit system further includes a second quadrature LO generator to produce a second pair of quadrature signals substantially 90° out of phase with each other over a frequency range of between about 800 MHz to 2.4 GHz.

30. The multiformat auto-handoff communications handset as defined in claim 29 wherein the first RF receive system further includes a first phase lock loop to adjust the tuning of the first quadrature LO generator and the first RF transmit system further includes a second phase lock loop to adjust the tuning of the second quadrature LO generator.

31. The multiformat auto-handoff communications handset as defined in claim 30 wherein the first RF signal path is identical to the second RF signal path.

32. The multiformat auto-handoff communications handset as defined in claim 31 wherein the multisystem controller monitors one of either the first RF receive signal in the first RF signal path or the second RF receive signal in the second RF signal path to determine whether to initiate a handoff between a currently operating signal format and signal frequency to an available signal format and signal frequency.

33. A method of supporting uninterrupted communications and hand-offs between multiple signal formats at multiple carrier frequencies through multiple service coverage areas, said method comprising the steps of:

providing a first antenna and a second antenna for receiving and transmitting the multiple signal formats at the multiple carrier frequencies in the multiple service coverage areas;

receiving a first RF receive signal of a first signal format in a first service coverage area and a second RF receive signal of a second signal format in a second service coverage area from the first antenna and the second antenna;

generating a first pair of quadrature signals substantially 90° out of phase of each other over a frequency range of between about 800 MHz to 2.4 GHz and down converting the first RF receive signal using said first pair of quadrature signals into a first IF receive signal in a first RF receive system and generating a second pair of quadrature signals substantially 90° out of phase of each other over a frequency range of between about 800 MHz to 2.4 GHz and down converting the second RF receive signal using said second pair of quadrature signals into a second IF receive signal in a second RF receive system;

demodulating the first IF receive signal in a first digital IF/baseband processor controller and demodulating the second IF receive signal in a second digital IF/baseband processor controller;

modulating a first IF transmit signal in the first digital IF/baseband processor controller and modulating a second IF transmit signal in the second digital IF/baseband processor controller;

up converting the first IF transmit signal into a first RF transmit signal in a first RF transmit system and up converting the second IF transmit signal into a second RF transmit signal in a second RF transmit system;

transmitting the first RF transmit signal of the first signal format in the first service coverage area and the second RF transmit signal of the second signal format in the second service coverage area from the first antenna and second antenna; and providing a multisystem controller for initiating and completing hand-offs to provide uninterrupted communication between the multiple signal formats at the multiple carrier frequencies through the multiple service coverage areas.

34. The method as defined in claim 33 wherein the step of providing a first antenna and a second antenna includes the steps of providing:

a linearly polarized antenna and a circularly polarized antenna to receive the first RF receive signal and the second RF receive signal and transmit the first RF transmit signal and the second RF transmit signal;

providing a bidirectional broadband duplexor/multiplexor to combine the first RF receive signal and the second RF receive signal into a combined RF receive signal and to separate a combined RF transmit signal into the first RF transmit signal and the second RF transmit signal;

providing a broadband low noise pre-amp to amplify the combined RF receive signal;

providing a power divider to split the combined RF receive signal;

providing a power combiner to combine the first RF transmit signal and the second RF transmit signal into the combined RF transmit signal; and providing a broadband power amp to amplify the combined RF transmit signal.

35. The method as defined in claim 33 wherein the step of down converting the first RF receive signal and the second RF receive signal include the steps of:

mixing the first RF receive signal with said first pair of quadrature signals in the first RF receive system; and mixing the second RF receive signal with said second pair of quadrature signals in the second RF receive system.

36. The method as defined in claim 33 wherein the step of demodulating the first IF receive signal and the second IF receive signal include the steps of:

extracting voice and operating data from the first IF receive signal in the first digital IF/baseband processor controller; and extracting voice and operating data from the second IF receive signal in the second digital IF/baseband processor controller.

37. The method as defined in claim 33 wherein the step of modulating the first IF transmit signal and the second IF transmit signal include the steps of:

modulating voice and operating data into the first IF transmit signal in the first digital IF/baseband processor controller; and modulating voice and operating data into the second IF transmit signal in the second digital IF/baseband processor controller.

38. The method as defined in claim 33 wherein the step of upconverting the first IF transmit signal and the second IF transmit signal includes the steps of:

mixing a quadrature pair of the first IF transmit signal with a pair of quadrature signals in the first RF transmit system; and mixing a quadrature pair of the second IF transmit signal with a pair of quadrature signals in the second RF transmit system.

39. The method as defined in claim 33 wherein the step of initiating and completing handoffs between the multiple signal formats at the multiple carrier frequencies includes the steps of:

monitoring the power level of one of either the first RF receive signal or the second RF receive signal with the multisystem controller; and directing one of either the first RF transmit system or the second RF transmit system to issue an order wire for initiating a handoff between a currently operating signal format and signal frequency to an available signal format and signal frequency.

* * * * *